US012217673B2

(12) United States Patent
Huang et al.

(10) Patent No.: US 12,217,673 B2
(45) Date of Patent: Feb. 4, 2025

(54) PIXEL CIRCUIT, DRIVING METHOD AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Yao Huang, Beijing (CN); Tianyi Cheng, Beijing (CN); Ming Hu, Beijing (CN); Weiyun Huang, Beijing (CN); Benlian Wang, Beijing (CN); Doyoung Kim, Beijing (CN); Long Ma, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/783,241

(22) PCT Filed: Jun. 23, 2021

(86) PCT No.: PCT/CN2021/101756
§ 371 (c)(1),
(2) Date: Jun. 7, 2022

(87) PCT Pub. No.: WO2022/266874
PCT Pub. Date: Dec. 29, 2022

(65) Prior Publication Data
US 2024/0169910 A1 May 23, 2024

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ......... G09G 3/3233; G09G 2300/0819; G09G 2300/0842; G09G 2310/08; G09G 2320/0233; G09G 2320/0247
See application file for complete search history.

(56) References Cited

U.S. PATENT DOCUMENTS

2013/0002632 A1 1/2013 Choi
2014/0049530 A1 2/2014 Uchino et al.
(Continued)

FOREIGN PATENT DOCUMENTS

CN 103366678 A 10/2013
CN 107358918 A 11/2017
(Continued)

OTHER PUBLICATIONS

CN 202180001589.5 first office action.
CN 202180001589.5 second office action.

*Primary Examiner* — Bryan Earles
(74) *Attorney, Agent, or Firm* — IPro, PLLC

(57) ABSTRACT

A pixel circuit includes a light-emitting element, a driving circuit, a first light-emitting control circuit, a compensation control circuit and a resetting circuit. The resetting circuit is configured to write an initial voltage into the first electrode of the light-emitting element under the control of a first light-emitting control signal, the first light-emitting control circuit is configured to control the first electrode of the light-emitting element to be electrically connected to the first terminal of the driving circuit under the control of a second light-emitting control signal, and the compensation control circuit is configured to control the control terminal of the driving circuit to be electrically connected to the first terminal of the driving circuit under the control of a first scanning signal.

20 Claims, 6 Drawing Sheets

(52) U.S. Cl.
CPC . *G09G 2310/08* (2013.01); *G09G 2320/0233* (2013.01); *G09G 2320/0247* (2013.01)

(56) References Cited

U.S. PATENT DOCUMENTS

| | | | |
|---|---|---|---|
| 2014/0055434 A1 | 2/2014 | Chang et al. | |
| 2019/0096327 A1 | 3/2019 | Peng et al. | |
| 2020/0273411 A1 | 8/2020 | Gao et al. | |
| 2020/0388214 A1 | 12/2020 | Yang | |
| 2021/0150985 A1* | 5/2021 | Li | G09G 3/3233 |
| 2021/0225293 A1 | 7/2021 | Wang | |
| 2021/0327352 A1 | 10/2021 | Zhang et al. | |
| 2021/0366363 A1 | 11/2021 | Lee et al. | |
| 2021/0375198 A1 | 12/2021 | Zhang et al. | |
| 2021/0383752 A1 | 12/2021 | Yang | |
| 2021/0407383 A1 | 12/2021 | Lai et al. | |
| 2021/0407419 A1 | 12/2021 | Li et al. | |
| 2022/0028338 A1 | 1/2022 | Yang et al. | |
| 2022/0130322 A1* | 4/2022 | Yuan | G09G 3/32 |
| 2022/0223106 A1 | 7/2022 | Kobayashi | |
| 2023/0092608 A1* | 3/2023 | Yuan | G09G 3/32<br>345/691 |

FOREIGN PATENT DOCUMENTS

| | | | |
|---|---|---|---|
| CN | 107452331 | A | 12/2017 |
| CN | 107610652 | A | 1/2018 |
| CN | 109410838 | A | 3/2019 |
| CN | 109599062 | A | 4/2019 |
| CN | 109979384 | A | 7/2019 |
| CN | 110176213 | A | 8/2019 |
| CN | 110268465 | A | 9/2019 |
| CN | 110660360 | A | 1/2020 |
| CN | 111415612 | A | 7/2020 |
| CN | 111462694 | A | 7/2020 |
| CN | 111489701 | A | 8/2020 |
| CN | 111710299 | A | 9/2020 |
| CN | 112116890 | A | 12/2020 |
| CN | 112382235 | A | 2/2021 |
| CN | 112634832 | A | 4/2021 |
| CN | 112735314 | A | 4/2021 |
| CN | 112767881 | A | 5/2021 |
| CN | 112908247 | A | 6/2021 |
| WO | 2020194647 | A1 | 10/2020 |

* cited by examiner

PIXEL CIRCUIT, DRIVING METHOD AND DISPLAY DEVICE

CROSS-REFERENCE TO RELATED APPLICATION

This application is the U.S. national phase of PCT Application No. PCT/CN2021/101756 filed on Jun. 23, 2021, which is incorporated by reference herein in its entirety.

TECHNICAL FIELD

The present disclosure relates to the field of display technology, in particular to a pixel circuit, a driving method and a display device.

BACKGROUND

The quantity of transistors is large in a low-temperature polycrystalline oxide (LTPO) pixel circuit in the related art, and it is difficult to provide a narrow bezel.

SUMMARY

In one aspect, a pixel circuit is provided in the embodiment of the present disclosure, including a light-emitting element, a driving circuit, a first light-emitting control circuit, a compensation control circuit and a resetting circuit. The resetting circuit is electrically connected to a first light-emitting control line, an initial voltage terminal and a first electrode of the light-emitting element, and configured to write an initial voltage at the initial voltage terminal into the first electrode of the light-emitting element under the control of a first light-emitting control signal from the first light-emitting control line. The first light-emitting control circuit is electrically connected to a second light-emitting control line, the first electrode of the light-emitting element and a first terminal of the driving circuit, and configured to control the first electrode of the light-emitting element to be electrically connected to the first terminal of the driving circuit under the control of a second light-emitting control signal from the second light-emitting control line. The compensation control circuit is electrically connected to a first scanning line, a control terminal of the driving circuit and the first terminal of the driving circuit, and configured to control the control terminal of the driving circuit to be electrically connected to the first terminal of the driving circuit under the control of a first scanning signal from the first scanning line. The driving circuit is configured to control the generation of a driving current for driving the light-emitting element to emit light under the control of a potential at the control terminal of the driving circuit. A second electrode of the light-emitting element is electrically connected to a first voltage terminal.

In a possible embodiment of the present disclosure, the pixel circuit further includes a second light-emitting control circuit, a data written-in circuit and an energy storage circuit. The second light-emitting control circuit is electrically connected to the first light-emitting control line, a second voltage terminal and a second terminal of the driving circuit, and configured to control the second voltage terminal to be electrically connected to the second terminal of the driving circuit under the control of the first light-emitting control signal. The data written-in circuit is electrically connected to a second scanning line, a data line and the second terminal of the driving circuit, and configured to write a data voltage from the data line into the second terminal of the driving circuit under the control of a second scanning signal from the second scanning line. The energy storage circuit is electrically connected to the control terminal of the driving circuit, and configured to store an electrical energy.

In a possible embodiment of the present disclosure, the resetting circuit includes a first transistor, the compensation control circuit includes a second transistor, the first light-emitting control circuit includes a third transistor, and the driving circuit includes a driving transistor. A control electrode of the first transistor is electrically connected to the first light-emitting control line, a first electrode of the first transistor is electrically connected to the initial voltage terminal, and a second electrode of the first transistor is electrically connected to the first electrode of the light-emitting element. A control electrode of the second transistor is electrically connected to the first scanning line, a first electrode of the second transistor is electrically connected to the control terminal of the driving circuit, and a second electrode of the second transistor is electrically connected to the first electrode of the driving circuit. A control electrode of the third transistor is electrically connected to the second light-emitting control line, a first electrode of the third transistor is electrically connected to the first terminal of the driving circuit, and a second electrode of the third transistor is electrically connected to the first electrode of the light-emitting element. A gate electrode of the driving transistor is electrically connected to the control terminal of the driving circuit, a first electrode of the driving transistor is electrically connected to the first terminal of the driving circuit, and a second electrode of the driving transistor is electrically connected to the second terminal of the driving circuit.

In a possible embodiment of the present disclosure, the first transistor and the second transistor are each an n-type transistor, and the driving transistor and the third transistor are each a p-type transistor.

In a possible embodiment of the present disclosure, the energy storage circuit includes a storage capacitor, a first terminal of the storage capacitor is electrically connected to the control terminal of the driving circuit, and a second terminal of the storage capacitor is electrically connected to the second voltage terminal.

In a possible embodiment of the present disclosure, the data written-in circuit includes a fourth transistor, and the second light-emitting control circuit includes a fifth transistor. A control electrode of the fourth transistor is electrically connected to the second scanning line, a first electrode of the fourth transistor is electrically connected to the data line, and a second electrode of the fourth transistor is electrically connected to the second terminal of the driving circuit. A control electrode of the fifth transistor is electrically connected to the first light-emitting control line, a first electrode of the fifth transistor is electrically connected to the second voltage terminal, and a second electrode of the fifth transistor is electrically connected to the second terminal of the driving circuit.

In a possible embodiment of the present disclosure, the fourth transistor and the fifth transistor are each a p-type transistor.

In a possible embodiment of the present disclosure, the light-emitting element is an organic light emitting diode, the first electrode of the light-emitting element is an anode of the organic light emitting diode, and the second electrode of the light-emitting element is a cathode of the organic light emitting diode.

In a second aspect, a driving method for the above-mentioned pixel circuit is provided in the embodiment of the present disclosure, the pixel circuit is applied to a display panel, a refresh display period includes a refresh resetting stage, and the driving method includes: within the refresh resetting stage, writing, by the resetting circuit, a first resetting voltage into the first electrode of the light-emitting element under the control of a first light-emitting control signal, controlling, by the first light-emitting control circuit, the first electrode of the light-emitting element to be electrically connected to the first terminal of the driving circuit under the control of a second light-emitting control signal, and controlling, by the compensation control circuit, the control terminal of the driving circuit to be electrically connected to the first terminal of the driving circuit under the control of the first scanning signal, to write the first resetting voltage into the control terminal of the driving circuit.

In a possible embodiment of the present disclosure, the refresh display period further includes a charging stage and a refresh light-emitting stage after the refresh resetting stage, the pixel circuit further includes a data written-in circuit and a second light-emitting control circuit, and the driving method further includes: within the charging stage, writing, by the data written-in circuit, the data voltage from the data line into the second terminal of the driving circuit under the control of a second scanning signal, and controlling, by the compensation control circuit, the control terminal of the driving circuit to be electrically connected to the first terminal of the driving circuit under the control of the first scanning signal, to charge the energy storage circuit via the data voltage; and within the refresh light-emitting stage, controlling, by the first light-emitting control circuit, the first electrode of the light-emitting element to be electrically connected to the first terminal of the driving circuit under the control of the second light-emitting control signal, controlling, by the second light-emitting control circuit, the second voltage terminal to be electrically connected to the second terminal of the driving circuit under the control of the first light-emitting control signal, and driving, by the driving circuit, the light-emitting element to emit light.

In a possible embodiment of the present disclosure, a display-maintaining period includes a resetting-maintaining stage and a light-emitting-maintaining stage arranged one after another, the driving method includes: within the resetting-maintaining stage, writing, by the resetting circuit, a second resetting voltage into the first electrode of the light-emitting element under the control of the first light-emitting control signal; and within the light-emitting-maintaining stage, controlling, by the first light-emitting control circuit, the first electrode of the light-emitting element to be electrically connected to the first terminal of the driving circuit under the control of the second light-emitting control signal, controlling, by the second light-emitting control circuit, the second voltage terminal to be electrically connected to the second terminal of the driving circuit under the control of the first light-emitting control signal, and driving, by the driving circuit, the light-emitting element to emit light.

In a possible embodiment of the present disclosure, the driving method further includes: detecting a display brightness range of the display panel, and in a case that a maximum brightness value corresponding to the display brightness range is less than or equal to a predetermined brightness value, increasing a frequency of the first light-emitting control signal, to enable the frequency of the first light-emitting control signal to be greater than a predetermined frequency.

In a possible embodiment of the present disclosure, the driving method further includes: increasing duration of the refresh resetting stage, to enable the duration of the refresh resetting stage to be greater than a predetermined time period.

In a possible embodiment of the present disclosure, the driving method further includes: controlling the second resetting voltage to be less than the first resetting voltage.

In a third aspect, a display device including the above-mentioned pixel circuit is provided in the embodiment of the present disclosure.

DETAILED DESCRIPTION

The technical solutions in the embodiments of the present disclosure will be described hereinafter clearly and completely with reference to the drawings of the embodiments of the present disclosure. Apparently, the following embodiments merely relate to a part of, rather than all of, the embodiments of the present disclosure, and based on these embodiments, a person of ordinary skill in the art may, without any creative effort, obtain other embodiments, which also fall within the scope of the present disclosure.

In the embodiments of the present disclosure, each transistor maybe a triode, a thin film transistor (TFT), a field effect transistor (FET), or any other element having a same characteristic. In order to differentiate two electrodes of the transistor, apart from a control electrode, from each other, one of the two electrodes may be called as a first electrode, and the other may be called as a second electrode.

In actual use, when the transistor is a triode, the control electrode may be a base, the first electrode may be a collector and the second electrode may be an emitter, or the control electrode may be a base, the first electrode may be an emitter and the second electrode may be a collector.

In actual use, when the transistor is a TFT or FET, the control electrode may be a gate electrode, the first electrode may be a drain electrode and the second electrode may be a source electrode, or the control electrode may be a gate electrode, the first electrode may be a source electrode and the second electrode may be a drain electrode.

Figure 1:
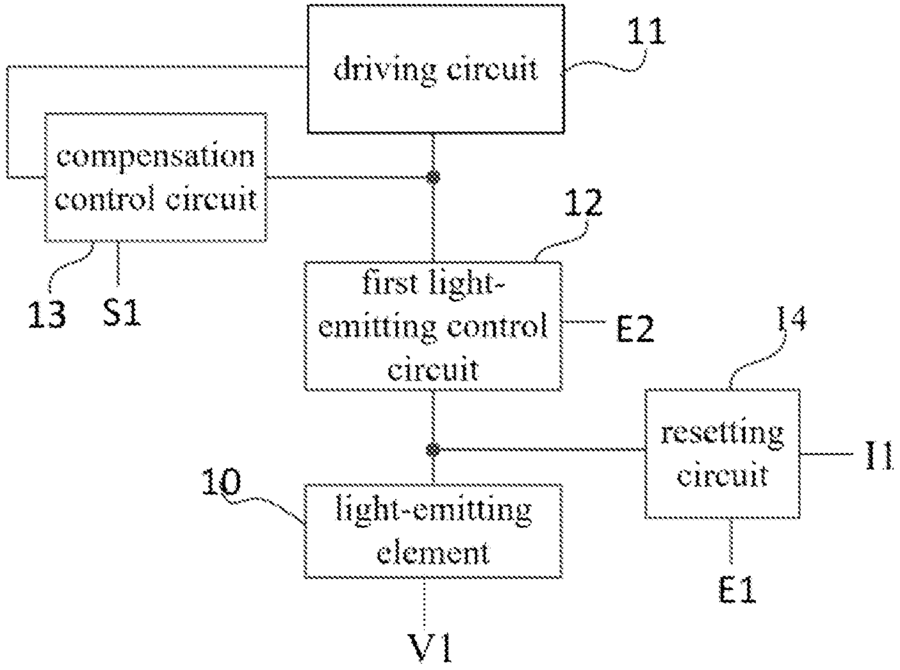
FIG. 1 is a schematic view showing a pixel circuit according to one embodiment of the present disclosure.

As shown in FIG. 1, a pixel circuit in the embodiments of the present disclosure includes a light-emitting element 10, a driving circuit 11, a first light-emitting control circuit 12, a compensation control circuit 13 and a resetting circuit 14.

The resetting circuit 14 is electrically connected to a first light-emitting control line E1, an initial voltage terminal I1 and a first electrode of the light-emitting element 10, and configured to write an initial voltage at the initial voltage terminal I1 into the first electrode of the light-emitting element 10 under the control of a first light-emitting control signal from the first light-emitting control line E1.

The first light-emitting control circuit 12 is electrically connected to a second light-emitting control line E2, the first electrode of the light-emitting element 10 and a first terminal of the driving circuit 11, and configured to control the first electrode of the light-emitting element 10 to be electrically connected to the first terminal of the driving circuit 11 under the control of a second light-emitting control signal from the second light-emitting control line E2.

The compensation control circuit 13 is electrically connected to a first scanning line S1, a control terminal of the driving circuit 11 and the first terminal of the driving circuit 11, and configured to control the control terminal of the driving circuit 11 to be electrically connected to the first terminal of the driving circuit 11 under the control of a first scanning signal from the first scanning line S1.

The driving circuit 11 is configured to control the generation of a driving current for driving the light-emitting element 11 to emit light under the control of a potential at the control terminal of the driving circuit 11.

A second electrode of the light-emitting element 10 is electrically connected to a first voltage terminal V1.

During the operation of the pixel circuit in FIG. 1, a refresh display period includes a refresh resetting stage, within the refresh resetting stage, the resetting circuit 14 writes a first resetting voltage at the initial voltage terminal I1 into the first electrode of the light-emitting element 10 under the control of a first light-emitting control signal, the first light-emitting control circuit controls the first electrode of the light-emitting element 10 to be electrically connected to the first terminal of the driving circuit 11 under the control of the second light-emitting control signal, and the compensation control circuit 13 controls the control terminal of the driving circuit 11 to be electrically connected to the first terminal of the driving circuit 11 under the control of the first scanning signal, to write the first resetting voltage at the initial voltage terminal I1 into the control terminal of the driving circuit.

In the pixel circuit shown in FIG. 1, through the cooperation of timing sequences of the first light-emitting control signal, the second light-emitting control signal and the first scanning signal, it is able to reset the control terminal of the driving circuit 11 through the resetting circuit 14, the first light-emitting control circuit 12 and the compensation control circuit 13 within the refresh resetting stage without using one additional transistor for resetting the control terminal of driving circuit, so as to reduce the quantity of transistors, thereby to provide a narrow bezel.

In the embodiment of the present disclosure, the resetting circuit 14 writes the initial voltage into the first electrode of the light-emitting element 10 under the control of the first light-emitting control signal, so as to clear a residual charge at the first electrode of the light-emitting element 10.

In a possible embodiment of the present disclosure, the refresh display period may be a refresh frame time period.

In at least one embodiment of the present disclosure, the pixel circuit further includes a second light-emitting control circuit, a data written-in circuit and an energy storage circuit. The second light-emitting control circuit is electrically connected to the first light-emitting control line, a second voltage terminal and a second terminal of the driving circuit, and configured to control the second voltage terminal to be electrically connected to the second terminal of the driving circuit under the control of the first light-emitting control signal. The data written-in circuit is electrically connected to a second scanning line, a data line and the second terminal of the driving circuit, and configured to write a data voltage from the data line into the second terminal of the driving circuit under the control of a second scanning signal from the second scanning line. The energy storage circuit is electrically connected to the control terminal of the driving circuit, and configured to store an electrical energy.

During the implementation, the pixel circuit further includes the second light-emitting control circuit, the data written-in circuit and the energy storage circuit, the second light-emitting control circuit controls the second voltage end to be electrically connected to, or electrically disconnected from, the second terminal of the driving circuit, and the data written-in circuit writes the data voltage into the second terminal of the driving circuit.

Figure 2:
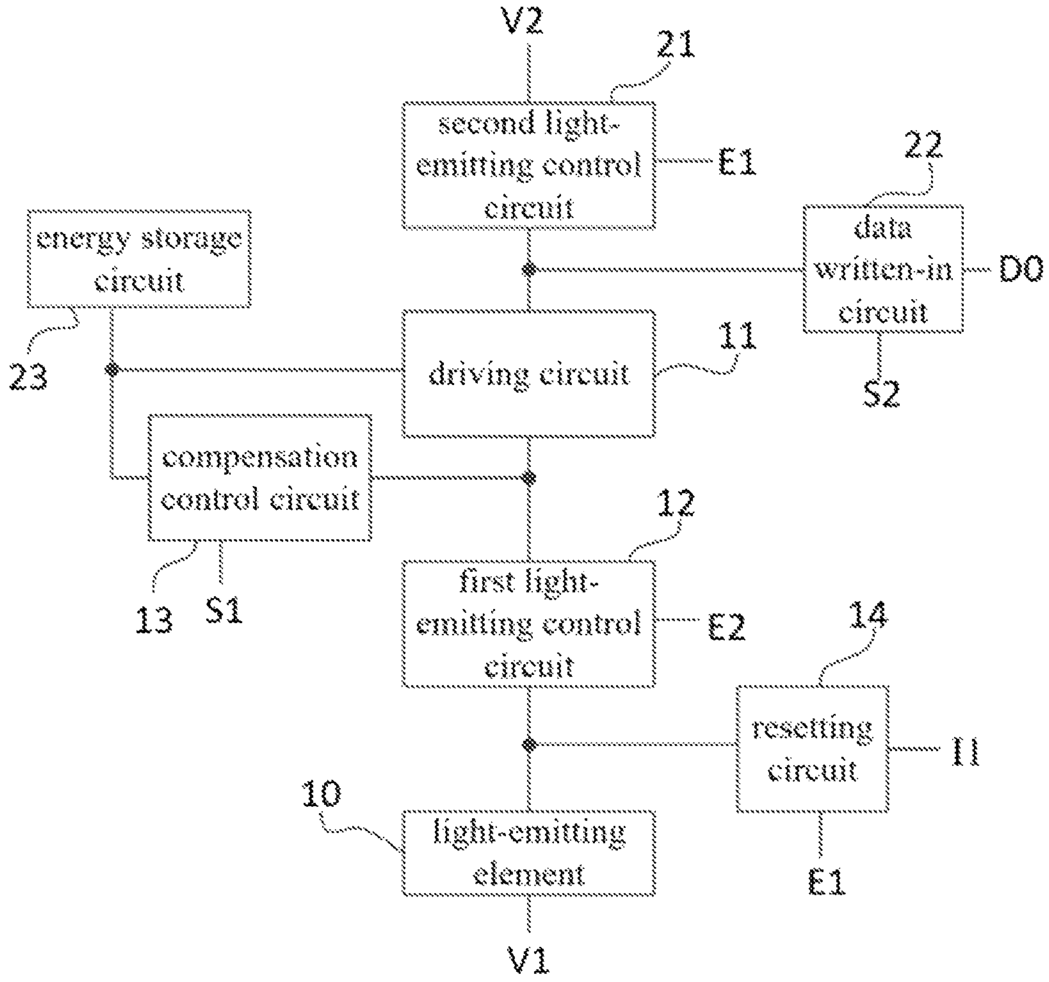
FIG. 2 is another schematic view showing the pixel circuit according to at least one embodiment of the present disclosure.

As shown in FIG. 2, on the basis of the pixel circuit in FIG. 1, the pixel circuit further includes a second light-emitting control circuit 21, a data written-in circuit 22 and an energy storage circuit 23.

The second light-emitting control circuit 21 is electrically connected to the first light-emitting control line E1, a second voltage terminal V2 and a second terminal of the driving circuit 11, and configured to control the second voltage terminal V2 to be electrically connected to the second terminal of the driving circuit 11 under the control of the first light-emitting control signal.

The data written-in circuit 22 is electrically connected to a second scanning line S2, a data line D0 and the second terminal of the driving circuit 11, and configured to write a data voltage from the data line D0 into the second terminal of the driving circuit 11 under the control of a second scanning signal from the second scanning line S2.

The energy storage circuit 23 is electrically connected to the control terminal of the driving circuit 11, and configured to store an electrical energy.

In the pixel circuit shown in FIG. 2, only the first scanning line and the second scanning line are used, so it is able to reduce the quantity of scanning lines (each scanning line may be a gate scanning line), thereby to reduce the loading of an overall Gate On Array (GOA, a gate driving circuit provided on the array substrate), provide a better charging advantage, and improve the low grayscale image quality.

During the operation of the pixel circuit in FIG. 2, the refresh display period may include a charging stage and a refresh light-emitting stage after the refresh resetting stage.

Within the charging stage, the data written-in circuit 22 writes the data voltage Vd from the data line D0 into the second terminal of the driving circuit 11 under the control of a second scanning signal, and the compensation control circuit 13 controls the control terminal of the driving circuit 11 to be electrically connected to the first terminal of the driving circuit 11 under the control of the first scanning signal, to charge the energy storage circuit 23 via the data voltage Vd.

At the beginning of the charging stage, the first terminal of the driving circuit is electrically connected to the second terminal of the driving circuit, and the energy storage circuit is charged through Vd until the potential at the control terminal of the driving circuit is Vd+Vth, and the first terminal of the driving circuit is electrically disconnected from the second terminal of the driving circuit.

Within the refresh light-emitting stage, the first light-emitting control circuit 12 controls the first electrode of the light-emitting element 10 to be electrically connected to the first terminal of the driving circuit 11 under the control of the second light-emitting control signal, the second light-emitting control circuit 21 controls the second voltage terminal V2 to be electrically connected to the second terminal of the driving circuit 11 under the control of the first light-emitting control signal, and the driving circuit 11 drives the light-emitting element 10 to emit light.

During the operation of the pixel circuit in FIG. 2, a display-maintaining period may include a resetting-maintaining stage and a light-emitting-maintaining stage arranged one after another, within the resetting-maintaining stage, the resetting circuit 14 writes a second resetting voltage at the initial voltage terminal I1 into the first electrode of the light-emitting element 10 under the control of the first light-emitting control signal. Within the light-emitting-maintaining stage, the first light-emitting control circuit 12 controls the first electrode of the light-emitting element 10 to be electrically connected to the first terminal of the driving circuit 11 under the control of the second light-emitting control signal, the second light-emitting control circuit controls the second voltage terminal V2 to be electrically connected to the second terminal of the driving circuit 11 under the control of the first light-emitting control signal, and the driving circuit 11 drives the light-emitting element 10 to emit light.

In a possible embodiment of the present disclosure, the display-maintaining period may be a maintaining frame time period.

During the operation of the pixel circuit according to at least one embodiment of the present disclosure, at least one display-maintaining period may be set after the refresh display period in a low frequency display. In the refresh display period, the charging stage is provided between the refresh resetting stage and the refresh light-emitting stage, and within the charging stage, the energy storage circuit 23 is charged by the data voltage Vd, so that the potential at the control terminal of the driving circuit 11 is related to the data voltage Vd, and within the refresh light-emitting stage, and the driving current for driving the light-emitting element 11 generated by the driving circuit 11 is related to Vd. Within the display-maintaining period, there is no process of charging the energy storage circuit 23, and within the light-emitting-maintaining stage, the driving current for driving the light-emitting element 11 generated by the driving circuit 11 is still related to the data voltage in the charging stage of an immediately previous refresh display period.

During the operation of the pixel circuit according to at least one embodiment of the present disclosure, the first resetting voltage may not be equal to the second resetting voltage, e.g., the second resetting voltage may be less than the first resetting voltage, so as to balance the brightness difference between the refresh display period and the display-maintaining period, thereby to mitigate the issue of flicker.

During the operation of the pixel circuit according to at least one embodiment of the present disclosure, it is able to mitigate the issue of flicker at low frequency and low brightness through increasing a frequency of resetting the first electrode of the light-emitting element 10 in the low brightness display.

For example, when a low brightness display is performed on a display panel to which the pixel circuit is applied, a frequency of the first light-emitting control signal is increased to be greater than a predetermined frequency, so as to increase the frequency of resetting the first electrode of the light-emitting element 10, thereby to mitigate the issue of flicker.

In at least one embodiment of the present disclosure, when the low brightness display is performed on the display panel, it means that a maximum brightness value corresponding to a display brightness range of the display panel is less than or equal to a predetermined brightness value. The predetermined brightness value may be greater than or equal to 100 nits and less than or equal to 140 nits. For example, the predetermined brightness value may be 120 nits.

In at least one embodiment of the present disclosure, in the case that the display panel is a display screen in a mobile phone, the display brightness range may be adjusted by pulling a brightness adjustment bar of the mobile phone.

The display brightness range of the display panel may be: the display brightness value of the display panel is greater than or equal to a first brightness value and less than or equal to a second brightness value, and the second brightness value is the maximum brightness value corresponding to the display brightness range.

The second brightness value may be a maximum brightness value of a display that is capable of being displayed in the display panel, and the first brightness value may be: a minimum brightness value of a display that is capable of being displayed in the display panel.

In at least one embodiment of the present disclosure, when the display brightness range of the display panel is within a predetermined brightness range, it does not mean that the display brightness range of the display panel is within the predetermined brightness range in the case that a predetermined image is displayed in the display panel, but it means that the display brightness range of the display panel is within the predetermined brightness range in the case that any image is displayed in the display panel.

In the related art, the first electrode of the light-emitting element 10 is reset through a transistor controlled by the second scanning signal, and in order to mitigate the issue of the flicker, a frequency of the second scanning signal needs to be increased in a low brightness display. However, in the pixel circuit of the embodiment of the present disclosure, the first electrode of the light-emitting element 10 is reset by the first light-emitting control signal, and there is no need to increase the frequency of the second scanning signal, so as to save the power consumption.

During the operation of the pixel circuit in at least one embodiment of the present disclosure, the first light-emitting control signal and the second light-emitting control signal are provided in a misalignment manner, so it is able to increase duration for resetting the potential at the control terminal of the driving circuit 11, thereby to mitigate the hysteresis of a driving transistor in the driving circuit to some extent.

In a possible embodiment of the present disclosure, the resetting circuit includes a first transistor, the compensation control circuit includes a second transistor, the first light-emitting control circuit includes a third transistor, and the driving circuit includes a driving transistor. A control electrode of the first transistor is electrically connected to the first light-emitting control line, a first electrode of the first transistor is electrically connected to the initial voltage terminal, and a second electrode of the first transistor is electrically connected to the first electrode of the light-emitting element. A control electrode of the second transistor is electrically connected to the first scanning line, a first electrode of the second transistor is electrically connected to the control terminal of the driving circuit, and a second electrode of the second transistor is electrically connected to the first electrode of the driving circuit. A control electrode of the third transistor is electrically connected to the second light-emitting control line, a first electrode of the third transistor is electrically connected to the first terminal of the driving circuit, and a second electrode of the third transistor is electrically connected to the first electrode of the light-emitting element. A gate electrode of the driving transistor is electrically connected to the control terminal of the driving circuit, a first electrode of the driving transistor is electrically connected to the first terminal of the driving circuit, and a second electrode of the driving transistor is electrically connected to the second terminal of the driving circuit.

In at least one embodiment of the present disclosure, the first transistor and the second transistor are each an n-type transistor, and the driving transistor and the third transistor are each a p-type transistor.

In a possible embodiment of the present disclosure, the first transistor and the second transistor may each be, but not limited to, an indium gallium zinc oxide (IGZO) thin-film transistor, and the third transistor and the driving transistor may each be, but not limited to, a low-temperature polysilicon thin-film transistor.

In a possible embodiment of the present disclosure, the energy storage circuit includes a storage capacitor, a first terminal of the storage capacitor is electrically connected to the control terminal of the driving circuit, and a second terminal of the storage capacitor is electrically connected to the second voltage terminal.

In a possible embodiment of the present disclosure, the data written-in circuit includes a fourth transistor, and the second light-emitting control circuit includes a fifth transistor. A control electrode of the fourth transistor is electrically connected to the second scanning line, a first electrode of the fourth transistor is electrically connected to the data line, and a second electrode of the fourth transistor is electrically connected to the second terminal of the driving circuit. A control electrode of the fifth transistor is electrically connected to the first light-emitting control line, a first electrode of the fifth transistor is electrically connected to the second voltage terminal, and a second electrode of the fifth transistor is electrically connected to the second terminal of the driving circuit.

In at least one embodiment of the present disclosure, the fourth transistor and the fifth transistor are each a p-type transistor.

In a possible embodiment of the present disclosure, the fourth transistor and the fifth transistor may each be a low temperature polysilicon thin-film transistor.

In a possible embodiment of the present disclosure, the light-emitting element is an organic light emitting diode, the first electrode of the light-emitting element is an anode of the organic light emitting diode, and the second electrode of the light-emitting element is a cathode of the organic light emitting diode.

In at least one embodiment of the present disclosure, the first voltage terminal may be a low voltage terminal, and the second voltage terminal may be a high voltage terminal.

Figure 3:
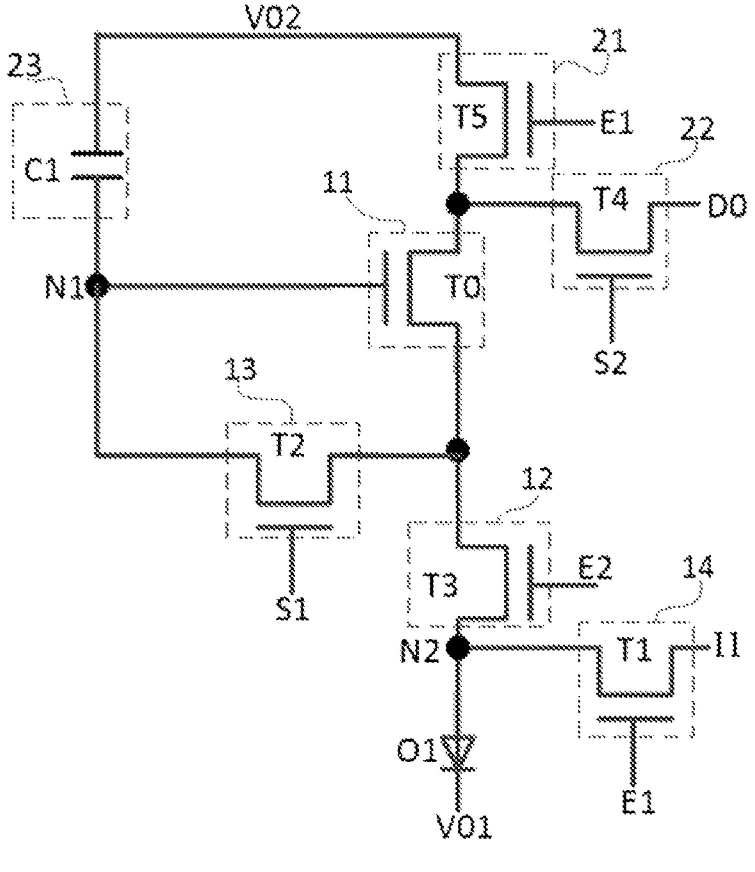
FIG. 3 is yet another schematic view showing the pixel circuit according to at least one embodiment of the present disclosure.

As shown in FIG. 3, on the basis of the pixel circuit in FIG. 2, the resetting circuit 14 includes a first transistor T1, the compensation control circuit 13 includes a second transistor T2, the first light-emitting control circuit 12 includes a third transistor T3, the driving circuit 11 includes a driving transistor T0, and the light-emitting element is an organic light emitting diode O1.

A gate electrode of the first transistor T1 is electrically connected to the first light-emitting controlling line E1, a source electrode of the first transistor T1 is electrically connected to the initial voltage terminal I1, and a drain electrode of the first transistor T1 is electrically connected to an anode of O1.

A gate electrode of the second transistor T2 is electrically connected to the first scanning line S1, a source electrode of the second transistor T2 is electrically connected to a gate electrode of the driving transistor T0, and a drain electrode of the second transistor T2 is electrically connected to a drain electrode of the driving transistor T0.

A gate electrode of the third transistor T3 is electrically connected to the second light-emitting controlling line E2, a source electrode of the third transistor T3 is electrically connected to a source electrode of the driving transistor T0, and a drain electrode of the third transistor T3 is electrically connected to the anode of the organic light emitting diode O1.

The energy storage circuit 23 includes a storage capacitor C1, a first terminal of the storage capacitor C1 is electrically connected to the gate electrode of the driving transistor T0, and a second terminal of the storage capacitor C1 is electrically connected to the high voltage terminal V02. The high voltage end V02 is used to provide a high voltage signal.

The data written-in circuit 22 includes a fourth transistor T4, and the second light-emitting control circuit 21 includes a fifth transistor T5.

A gate electrode of the fourth transistor T4 is electrically connected to the second scanning line S2, a drain electrode of the fourth transistor T4 is electrically connected to the data line D0, and a source electrode of the fourth transistor T4 is electrically connected to the source electrode of the driving transistor T0.

A gate electrode of the fifth transistor T5 is electrically connected to the first light-emitting controlling line E1, a source electrode of the fifth transistor T5 is electrically connected to the high voltage terminal V02, and a drain electrode of the fifth transistor T5 is electrically connected to the source electrode of the driving transistor T0.

A cathode of O1 is electrically connected to the low voltage terminal Vol. The low voltage terminal is used to provide a low voltage signal.

In the pixel circuit shown in FIGS. 3, T1 and T2 are each an IGZO thin-film transistor, and T0, T3, T4 and T5 are each a low temperature polysilicon thin-film transistor.

In the pixel circuit shown in FIGS. 3, T1 and T2 are each an n-type transistor, and T0, T3, T4 and T5 are each a p-type transistor.

As shown in FIG. 3, only six transistors and only two scanning lines are used, so it is able to provide a narrow bezel, reduce the loading of the overall Gate GOA, thereby to provide a better charging advantage, and improve the low grayscale image quality.

In FIG. 3, N1 denotes a control node, N2 denotes a light-emitting node, the control node N1 is electrically connected to the gate electrode of T0, and the light-emitting node N2 is electrically connected to the anode of O1.

Figure 4:
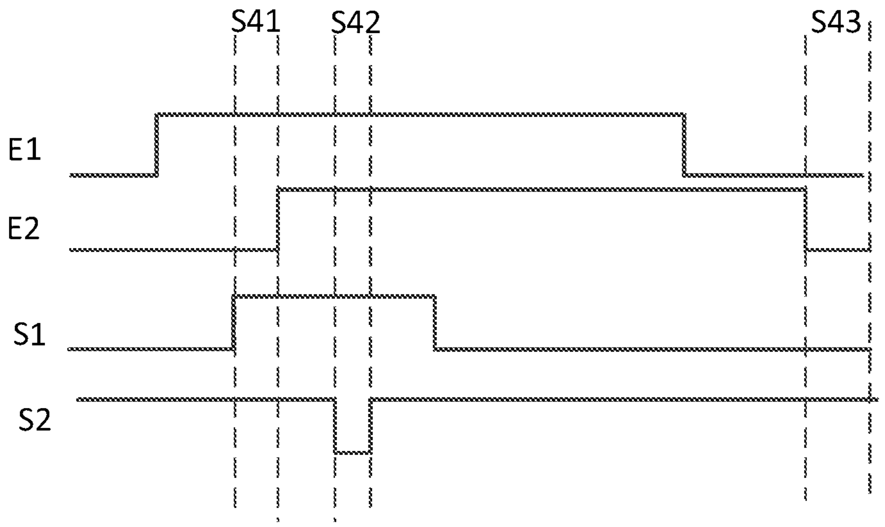
FIG. 4 is a sequence diagram of the pixel circuit in FIG. 3.

As shown in FIG. 4, during the operation the pixel circuit in FIG. 3, the refresh frame time period may include a refresh resetting stage S41, a charging stage S42 and a refresh light-emitting stage S43 arranged one after another.

Within the refresh resetting stage S41, a high voltage signal is applied to E1, a low voltage signal is applied to E2, a high voltage signal is applied to S1, a high voltage signal is applied to S2, T1, T2 and T3 are turned on, and a first resetting voltage Vi1 at I1 is applied to the control node N1 and the light-emitting node N2. The first reset voltage Vi1 may be −3V, so that O1 does not emit light, and T3 is able to be turned on at the beginning of the charging stage S42.

Within the charging stage S42, a high voltage signal is applied to E1, a high voltage signal is applied to E2, a high voltage signal is applied to S1, a low voltage signal is applied to S2, T4, T0 and T2 are turned on, and the data voltage Vd from D0 is written into N1 through T0, so as to charge C1, thereby to compensate for a threshold voltage Vth of T0. At the beginning of S42, T0 is turned on, so as to charge C1 via Vd, thereby to increase the potential at N1 until the potential at N1 is Vd+Vth. Next, T0 is turned off.

Within the refresh light-emitting stage S43, a low voltage signal is applied to E1 and E2, a low voltage signal is applied to S1, a high voltage signal is applied to S2, T3 and T5 are turned on, and T0 drives O1 to emit light. A driving current I that T0 drives O1 to emit light is equal to $0.5K(Vz2-Vd)^2$, where Vz2 is a voltage value of the high voltage signal at the high voltage terminal V02 and K is a current coefficient of T0.

Figure 5:
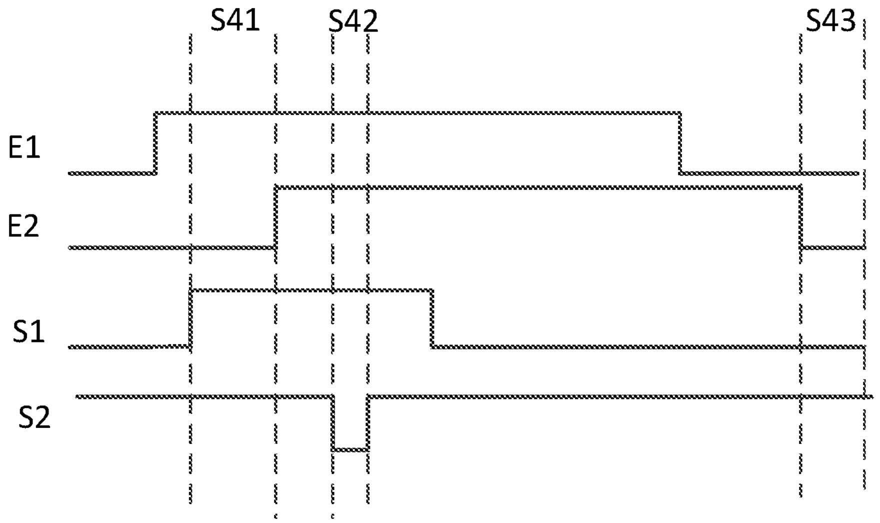
FIG. 5 is another sequence diagram of the pixel circuit in FIG. 3.

As shown in FIG. 5, through adjusting the timing sequence of the first light-emitting control signal and the timing sequence of the second light-emitting control signal such that it is able to increase duration of the refresh resetting stage S41, and increase duration for resetting the potential at N1, thereby to mitigate the hysteresis of T0 to some extent.

In a possible embodiment of the present disclosure, the duration of the refresh resetting stage S41 may be greater than a predetermined time period. The predetermined time period may be 1H (a scanning time period in one row).

Figure 6:
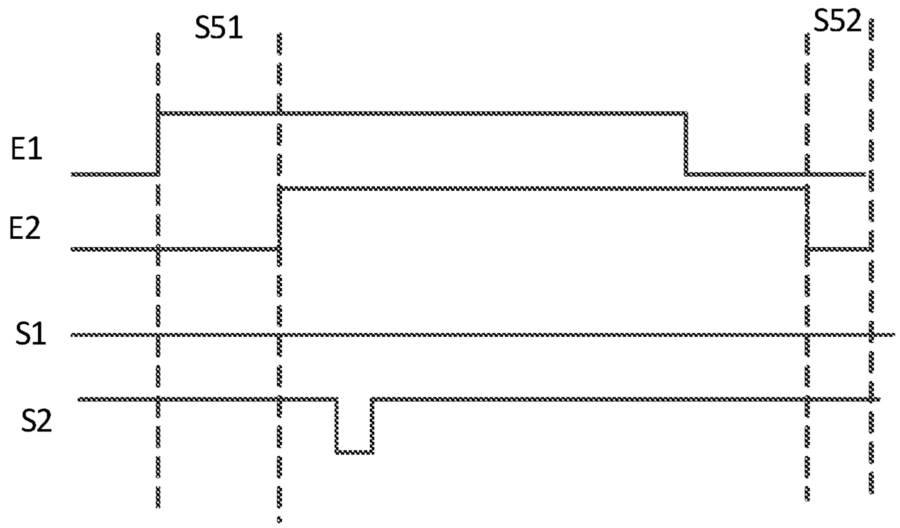
FIG. 6 is yet another sequence diagram of the pixel circuit in FIG. 3.

As shown in FIG. 6, during the operation of the pixel circuit in FIG. 3, the maintaining frame time period may include a resetting-maintaining stage S51 and a light-emitting-maintaining stage S52 arranged one after another.

Within the resetting-maintaining stage S51, a high voltage signal is applied to E1, a low voltage signal is applied to E2, a low voltage signal is applied to S1, and a second resetting voltage Vi2 from I1 is applied to N2.

Within the light-emitting-maintaining stage S52, a low voltage signal is applied to E1 and E2, a low voltage signal is applied to S1, a high voltage signal is applied to S2, T3 and T5 are turned on, and T0 drives the O1 to emit light. A driving current I that T0 drives O1 to emit light is equal to $0.5K(Vz2-Vd)^2$, where Vz2 is a voltage value of the high voltage signal at the high voltage terminal V02, K is a current coefficient of T0, Vd is the data voltage from D0 in the charging stage of a previous refresh display period adjacent to the maintaining frame time period.

During the operation of the pixel circuit in FIG. 3, Vi2 may be less than Vi1, so as to balance the brightness difference between the refresh frame time period and the maintaining frame time period, thereby to mitigate the issue of flicker.

In at least one embodiment of the present disclosure, Vi2 may be greater than or equal to −5V and less than or equal to −3V.

Figure 7:
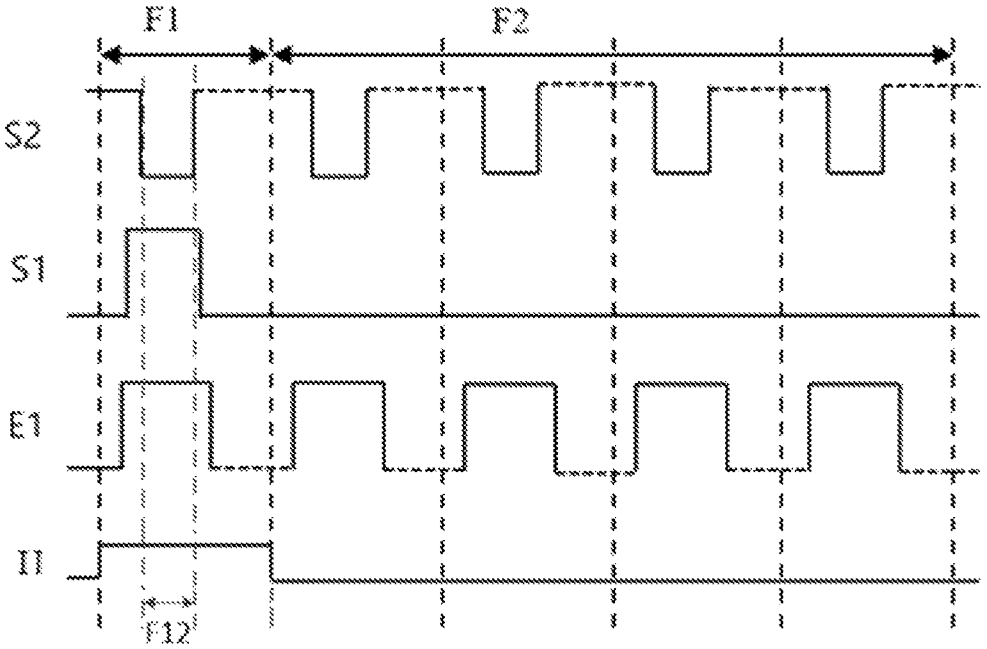
FIG. 7 is still yet another sequence diagram of the pixel circuit in FIG. 3.

As shown in FIG. 7, during the operation of the pixel circuit in FIG. 3, it is able to mitigate the issue of flicker of O1 at low frequency and low brightness through increasing the frequency of the first light-emitting control signal in the low brightness display.

In FIG. 7, F1 denotes the refresh frame time period, and F2 denotes the maintaining frame time period.

In the refresh frame time period F1, the charging stage F12 exists, and within the charging stage F12, a high voltage signal is applied to E1, a high voltage signal is applied to S1, a low voltage signal is applied to S2, and C1 is charged via the data voltage from the data line D0.

In the maintaining frame time period F2, there is no charging stage and a low voltage signal is applied to S1 in the entire maintaining frame time period F2.

As shown in FIG. 7, in a low brightness display, the frequency of the first light-emitting control signal from E1 may be increased to be greater than a predetermined frequency. For example, the frequency of the first light-emitting control signal from E1 may be greater than or equal to 50 Hz, e.g., the frequency of the first light-emitting control signal may be 60 Hz. In other words, the predetermined frequency may be 50 Hz.

As shown in FIG. 7, Vi2 is less than Vi1, Vi1 is a first initial voltage from I1 in F1, and Vi2 is a second initial voltage from I1 in F2.

Figure 8:
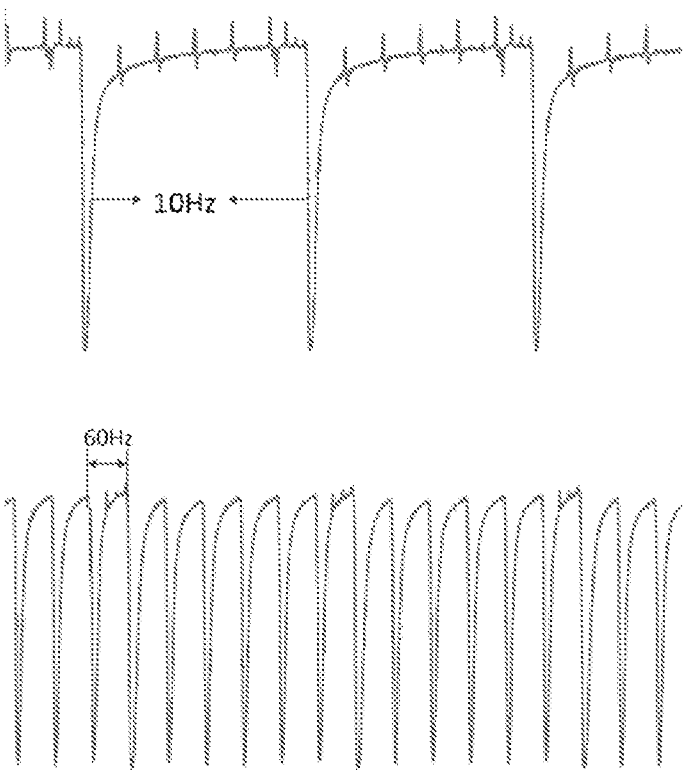
FIG. 8 is a schematic view showing brightness values of light emitted by an organic light emitting diode O1 in the case that frequencies of a first light-emitting control signal are 10 Hz and 60 Hz.

As shown in FIG. 8, in the case that the frequency of the first light-emitting control signal is 10 Hz, the light emitted by O1 is in a low-frequency flicker state, and human eyes are quite sensitive to the low-frequency flicker. In the case that the frequency of the first light-emitting control signal is 60 Hz, the light from O1 is in a high frequency flicker state to which human eyes are not sensitive, so it is able to mitigate the issue of flicker.

A driving method for the above-mentioned pixel circuit is provided in the embodiment of the present disclosure, the pixel circuit is applied to a display panel, a refresh display period includes a refresh resetting stage, and the driving method includes: within the refresh resetting stage, writing, by the resetting circuit, a first resetting voltage into the first electrode of the light-emitting element under the control of a first light-emitting control signal, controlling, by the first light-emitting control circuit, the first electrode of the light-emitting element to be electrically connected to the first terminal of the driving circuit under the control of a second light-emitting control signal, and controlling, by the compensation control circuit, the control terminal of the driving circuit to be electrically connected to the first terminal of the driving circuit under the control of the first scanning signal, to write the first resetting voltage into the control terminal of the driving circuit.

In the driving method of the present disclosure, through the cooperation of timing sequences of the first light-emitting control signal, the second light-emitting control signal and the first scanning signal, it is able to reset the control terminal of the driving circuit through the resetting circuit, the first light-emitting control circuit and the compensation control circuit within the refresh resetting stage without using one additional transistor for resetting the control terminal of driving circuit, so as to reduce the quantity of transistors, thereby to provide a narrow bezel.

In a possible embodiment of the present disclosure, the refresh display period further includes a charging stage and a refresh light-emitting stage after the refresh resetting stage, the pixel circuit further includes a data written-in circuit and a second light-emitting control circuit, and the driving method further includes: within the charging stage, writing, by the data written-in circuit, the data voltage from the data line into the second terminal of the driving circuit under the control of a second scanning signal, and controlling, by the compensation control circuit, the control terminal of the driving circuit to be electrically connected to the first terminal of the driving circuit under the control of the first scanning signal, to charge the energy storage circuit via the data voltage; and within the refresh light-emitting stage, controlling, by the first light-emitting control circuit, the first electrode of the light-emitting element to be electrically connected to the first terminal of the driving circuit under the control of the second light-emitting control signal, controlling, by the second light-emitting control circuit, the second voltage terminal to be electrically connected to the second terminal of the driving circuit under the control of the first light-emitting control signal, and driving, by the driving circuit, the light-emitting element to emit light.

During the implementation, the charging stage and the refresh light-emitting stage are further provided after the refresh resetting stage. Within the charging stage, the energy storage circuit is charged by the data voltage from the data line, and within the refresh light-emitting stage, the driving circuit drives the light-emitting element to emit light in accordance with the data voltage.

In at least one embodiment of the present disclosure, a display-maintaining period includes a resetting-maintaining stage and a light-emitting-maintaining stage arranged one after another, the driving method includes: within the resetting-maintaining stage, writing, by the resetting circuit, a second resetting voltage into the first electrode of the light-emitting element under the control of the first light-emitting control signal; and within the light-emitting-maintaining stage, controlling, by the first light-emitting control circuit, the first electrode of the light-emitting element to be electrically connected to the first terminal of the driving circuit under the control of the second light-emitting control signal, controlling, by the second light-emitting control circuit, the second voltage terminal to be electrically connected to the second terminal of the driving circuit under the control of the first light-emitting control signal, and driving, by the driving circuit, the light-emitting element to emit light.

During the implementation, the display-maintaining period does not include a stage for charging, and within the resetting-maintaining stage, the resetting circuit resets the potential at the first electrode of the light-emitting element, so as to control the light-emitting element not to emit light. Within the light-emitting-maintaining stage, the driving circuit drives the light-emitting element to emit light in accordance with the data voltage written in the charging stage of an adjacent previous refresh display period.

In a possible embodiment of the present disclosure, the driving method may further include: detecting a display brightness range of the display panel, and in a case that a maximum brightness value corresponding to the display brightness range is less than or equal to a predetermined brightness value, increasing a frequency of the first light-emitting control signal, to enable the frequency of the first light-emitting control signal to be greater than a predetermined frequency. Thus, the frequency of the first light-emitting control signal is greater than the predetermined frequency in the low brightness display, so as to increase the frequency of resetting the first electrode of the light-emitting element 10, thereby to mitigate the issue of flicker.

In at least one embodiment of the present disclosure, in the case that the maximum brightness value corresponding to the display brightness range of the display panel is less than or equal to the predetermined brightness value, the frequency of the first light-emitting control signal is controlled to be increased. In the case that the maximum brightness value is greater than the predetermined brightness value, the frequency of the first light-emitting control signal may be controlled to be less than a predetermined frequency.

In a possible embodiment of the present disclosure, the predetermined frequency may be 50 Hz. For example, in the case that the maximum brightness value is greater than the predetermined brightness value, the frequency of the first light-emitting control signal may be controlled to be 60 Hz.

In at least one embodiment of the present disclosure, the predetermined brightness value may be greater than or equal to 100 nits and less than or equal to 140 nits. For example, the predetermined brightness value may be 120 nits.

In at least one embodiment of the present disclosure, in the case that the display panel is a display screen in a mobile phone, the display brightness range may be adjusted by pulling a brightness adjustment bar of the mobile phone.

The display brightness range of the display panel may be: the display brightness value of the display panel is greater than or equal to a first brightness value and less than or equal to a second brightness value, and the second brightness value is the maximum brightness value corresponding to the display brightness range.

The second brightness value may be a maximum brightness value of a display that is capable of being displayed in the display panel, and the first brightness value may be: a minimum brightness value of a display that is capable of being displayed in the display panel.

In at least one embodiment of the present disclosure, when the display brightness range of the display panel is within a predetermined brightness range, it does not mean that the display brightness range of the display panel is within the predetermined brightness range in the case that a predetermined image is displayed in the display panel, but it means that the display brightness range of the display panel is within the predetermined brightness range in the case that any image is displayed in the display panel.

In at least one embodiment of the present disclosure, the driving method may further include: increasing duration of the refresh resetting stage, to enable the duration of the refresh resetting stage to be greater than a predetermined time period. Hence, it is able to increase duration for resetting the potential at the control terminal of the driving circuit 11, thereby to mitigate the hysteresis of a driving transistor in the driving circuit to some extent.

In a possible embodiment of the present disclosure, the driving method further includes: controlling the second resetting voltage to be less than the first resetting voltage. As a result, it is able to balance the difference in brightness between the refresh display period and the display-maintaining period, thereby to mitigate the issue of flicker.

A display device including the above-mentioned pixel circuit is further provided in some embodiments of the present disclosure.

The display device may be any product or member having a display function, e.g., a mobile phone, a flat-panel computer, a television, a display, a laptop computer, a digital photo frame or a navigator.

The above embodiments are optional embodiments of the present disclosure, it should be appreciated, those skilled in the art may make various improvements and modifications without departing from the principle of the present disclosure, and theses improvement and modifications shall fall within the protection scope of the present disclosure.

What is claimed is:

1. A pixel circuit, comprising a light-emitting element, a driving circuit, a first light-emitting control circuit, a compensation control circuit and a resetting circuit; wherein a refresh display period of the pixel circuit comprises a refresh resetting stage, and at least one display-maintaining period comprising a resetting-maintaining stage is set after the refresh display period; wherein, the resetting circuit is electrically connected to a first light-emitting control line, an initial voltage terminal and a first electrode of the light-emitting element, and configured to write an initial voltage at the initial voltage terminal into the first electrode of the light-emitting element under the control of a first light-emitting control signal from the first light-emitting control line;

the first light-emitting control circuit is electrically connected to a second light-emitting control line, the first electrode of the light-emitting element and a first terminal of the driving circuit, and configured to control the first electrode of the light-emitting element to be electrically connected to the first terminal of the driving circuit under the control of a second light-emitting control signal from the second light-emitting control line;

the compensation control circuit is electrically connected to a first scanning line, a control terminal of the driving circuit and the first terminal of the driving circuit, and configured to control the control terminal of the driving circuit to be electrically connected to the first terminal of the driving circuit under the control of a first scanning signal from the first scanning line;

the driving circuit is configured to control the generation of a driving current for driving the light-emitting element to emit light under the control of a potential at the control terminal of the driving circuit; and a second electrode of the light-emitting element is electrically connected to a first voltage terminal;

wherein, the resetting circuit is configured to write, within the refresh resetting stage, a first resetting voltage into the first electrode of the light-emitting element under the control of a first light-emitting control signal;

the first light-emitting control circuit is configured to control, within the refresh resetting stage, the first electrode of the light-emitting element to be electrically connected to the first terminal of the driving circuit under the control of a second light-emitting control signal;

the compensation control circuit is configured to control, within the refresh resetting stage, the control terminal of the driving circuit to be electrically connected to the first terminal of the driving circuit under the control of the first scanning signal, to write the first resetting voltage into the control terminal of the driving circuit;

the resetting circuit is further configured to write, within the resetting-maintaining stage, a second resetting voltage into the first electrode of the light-emitting element under the control of a first light-emitting control signal;

the first light-emitting control circuit is further configured to control, within the resetting-maintaining stage, the first electrode of the light-emitting element to be electrically connected to the first terminal of the driving circuit under the control of a second light-emitting control signal, to write the second resetting voltage into the first terminal of the driving circuit;

the compensation control circuit is further configured to control, within the resetting-maintaining stage, the control terminal of the driving circuit to be electrically disconnected from the first terminal of the driving circuit under the control of the first scanning signal.

2. The pixel circuit according to claim 1, further comprising a second light-emitting control circuit, a data written-in circuit and an energy storage circuit;

the second light-emitting control circuit is electrically connected to the first light-emitting control line, a second voltage terminal and a second terminal of the driving circuit, and configured to control the second voltage terminal to be electrically connected to the second terminal of the driving circuit under the control of the first light-emitting control signal;

the data written-in circuit is electrically connected to a second scanning line, a data line and the second terminal of the driving circuit, and configured to write a data voltage from the data line into the second terminal of the driving circuit under the control of a second scanning signal from the second scanning line; and the energy storage circuit is electrically connected to the control terminal of the driving circuit, and configured to store an electrical energy.

3. The pixel circuit according to claim 1, wherein the resetting circuit comprises a first transistor, the compensation control circuit comprises a second transistor, the first light-emitting control circuit comprises a third transistor, and the driving circuit comprises a driving transistor;

a control electrode of the first transistor is electrically connected to the first light-emitting control line, a first electrode of the first transistor is electrically connected to the initial voltage terminal, and a second electrode of the first transistor is electrically connected to the first electrode of the light-emitting element;

a control electrode of the second transistor is electrically connected to the first scanning line, a first electrode of the second transistor is electrically connected to the control terminal of the driving circuit, and a second electrode of the second transistor is electrically connected to the first electrode of the driving circuit;

a control electrode of the third transistor is electrically connected to the second light-emitting control line, a first electrode of the third transistor is electrically connected to the first terminal of the driving circuit, and a second electrode of the third transistor is electrically connected to the first electrode of the light-emitting element; and a gate electrode of the driving transistor is electrically connected to the control terminal of the driving circuit, a first electrode of the driving transistor is electrically connected to the first terminal of the driving circuit, and a second electrode of the driving transistor is electrically connected to the second terminal of the driving circuit.

4. The pixel circuit according to claim 3, wherein the first transistor and the second transistor are each an n-type transistor, and the driving transistor and the third transistor are each a p-type transistor.

5. The pixel circuit according to claim 2, wherein the energy storage circuit comprises a storage capacitor, a first terminal of the storage capacitor is electrically connected to the control terminal of the driving circuit, and a second terminal of the storage capacitor is electrically connected to the second voltage terminal.

6. The pixel circuit according to claim 2, wherein the data written-in circuit comprises a fourth transistor, and the second light-emitting control circuit comprises a fifth transistor;

a control electrode of the fourth transistor is electrically connected to the second scanning line, a first electrode of the fourth transistor is electrically connected to the data line, and a second electrode of the fourth transistor is electrically connected to the second terminal of the driving circuit; and a control electrode of the fifth transistor is electrically connected to the first light-emitting control line, a first electrode of the fifth transistor is electrically connected to the second voltage terminal, and a second electrode of the fifth transistor is electrically connected to the second terminal of the driving circuit.

7. The pixel circuit according to claim 6, wherein the fourth transistor and the fifth transistor are each a p-type transistor.

8. The pixel circuit according to claim 1, wherein the light-emitting element is an organic light emitting diode, the first electrode of the light-emitting element is an anode of the organic light emitting diode, and the second electrode of the light-emitting element is a cathode of the organic light emitting diode.

9. A driving method for the pixel circuit according to claim 1, the pixel circuit being applied to a display panel, a refresh display period comprising a refresh resetting stage, and the driving method comprising:

within the refresh resetting stage, writing, by the resetting circuit, a first resetting voltage into the first electrode of the light-emitting element under the control of a first light-emitting control signal, controlling, by the first light-emitting control circuit, the first electrode of the light-emitting element to be electrically connected to the first terminal of the driving circuit under the control of a second light-emitting control signal, and controlling, by the compensation control circuit, the control terminal of the driving circuit to be electrically connected to the first terminal of the driving circuit under the control of the first scanning signal, to write the first resetting voltage into the control terminal of the driving circuit.

10. The driving method according to claim 9, wherein the refresh display period further comprises a charging stage and a refresh light-emitting stage after the refresh resetting stage, the pixel circuit further comprises a data written-in circuit and a second light-emitting control circuit, and the driving method further comprises:

within the charging stage, writing, by the data written-in circuit, the data voltage from the data line into the second terminal of the driving circuit under the control of a second scanning signal, and controlling, by the compensation control circuit, the control terminal of the driving circuit to be electrically connected to the first terminal of the driving circuit under the control of the first scanning signal, to charge the energy storage circuit via the data voltage; and within the refresh light-emitting stage, controlling, by the first light-emitting control circuit, the first electrode of the light-emitting element to be electrically connected to the first terminal of the driving circuit under the control of the second light-emitting control signal, controlling, by the second light-emitting control circuit, the second voltage terminal to be electrically connected to the second terminal of the driving circuit under the control of the first light-emitting control signal, and driving, by the driving circuit, the light-emitting element to emit light.

11. The driving method according to claim 10, wherein the display-maintaining period comprises the resetting-maintaining stage and a light-emitting-maintaining stage arranged one after another, the driving method comprises:

within the resetting-maintaining stage, writing, by the resetting circuit, a second resetting voltage into the first electrode of the light-emitting element under the control of the first light-emitting control signal; and within the light-emitting-maintaining stage, controlling, by the first light-emitting control circuit, the first electrode of the light-emitting element to be electrically connected to the first terminal of the driving circuit under the control of the second light-emitting control signal, controlling, by the second light-emitting control circuit, the second voltage terminal to be electrically connected to the second terminal of the driving circuit under the control of the first light-emitting control signal, and driving, by the driving circuit, the light-emitting element to emit light.

12. The driving method according to claim 10, further comprising:

detecting a display brightness range of the display panel, and in a case that a maximum brightness value corresponding to the display brightness range is less than or equal to a predetermined brightness value, increasing a frequency of the first light-emitting control signal, to enable the frequency of the first light-emitting control signal to be greater than a predetermined frequency.

13. The driving method according to claim 9, further comprising: increasing duration of the refresh resetting stage, to enable the duration of the refresh resetting stage to be greater than a predetermined time period.

14. The driving method according to claim 11, further comprising: controlling the second resetting voltage to be less than the first resetting voltage.

15. A display device comprising a pixel circuit, wherein the pixel circuit comprises a light-emitting element, a driving circuit, a first light-emitting control circuit, a compensation control circuit and a resetting circuit; wherein a refresh display period of the pixel circuit comprises a refresh resetting stage, and at least one display-maintaining period comprising a resetting-maintaining stage is set after the refresh display period; wherein, the resetting circuit is electrically connected to a first light-emitting control line, an initial voltage terminal and a first electrode of the light-emitting element, and configured to write an initial voltage at the initial voltage terminal into the first electrode of the light-emitting element under the control of a first light-emitting control signal from the first light-emitting control line;

the first light-emitting control circuit is electrically connected to a second light-emitting control line, the first electrode of the light-emitting element and a first terminal of the driving circuit, and configured to control the first electrode of the light-emitting element to be electrically connected to the first terminal of the driving circuit under the control of a second light-emitting control signal from the second light-emitting control line;

the compensation control circuit is electrically connected to a first scanning line, a control terminal of the driving circuit and the first terminal of the driving circuit, and configured to control the control terminal of the driving circuit to be electrically connected to the first terminal of the driving circuit under the control of a first scanning signal from the first scanning line;

the driving circuit is configured to control the generation of a driving current for driving the light-emitting element to emit light under the control of a potential at the control terminal of the driving circuit; and a second electrode of the light-emitting element is electrically connected to a first voltage terminal;

wherein, the resetting circuit is configured to write, within the refresh resetting stage, a first resetting voltage into the first electrode of the light-emitting element under the control of a first light-emitting control signal;

the first light-emitting control circuit is configured to control, within the refresh resetting stage, the first electrode of the light-emitting element to be electrically connected to the first terminal of the driving circuit under the control of a second light-emitting control signal;

the compensation control circuit is configured to control, within the refresh resetting stage, the control terminal of the driving circuit to be electrically connected to the first terminal of the driving circuit under the control of the first scanning signal, to write the first resetting voltage into the control terminal of the driving circuit;

the resetting circuit is further configured to write, within the resetting-maintaining stage, a second resetting voltage into the first electrode of the light-emitting element under the control of a first light-emitting control signal;

the first light-emitting control circuit is further configured to control, within the resetting-maintaining stage, the first electrode of the light-emitting element to be electrically connected to the first terminal of the driving circuit under the control of a second light-emitting control signal, to write the second resetting voltage into the first terminal of the driving circuit;

the compensation control circuit is further configured to control, within the resetting-maintaining stage, the control terminal of the driving circuit to be electrically disconnected from the first terminal of the driving circuit under the control of the first scanning signal.

16. The display device according to claim 15, further comprising a second light-emitting control circuit, a data written-in circuit and an energy storage circuit;

the second light-emitting control circuit is electrically connected to the first light-emitting control line, a second voltage terminal and a second terminal of the driving circuit, and configured to control the second voltage terminal to be electrically connected to the second terminal of the driving circuit under the control of the first light-emitting control signal;

the data written-in circuit is electrically connected to a second scanning line, a data line and the second terminal of the driving circuit, and configured to write a data voltage from the data line into the second terminal of the driving circuit under the control of a second scanning signal from the second scanning line; and the energy storage circuit is electrically connected to the control terminal of the driving circuit, and configured to store an electrical energy.

17. The display device according to claim 15, wherein the resetting circuit comprises a first transistor, the compensation control circuit comprises a second transistor, the first light-emitting control circuit comprises a third transistor, and the driving circuit comprises a driving transistor;

a control electrode of the first transistor is electrically connected to the first light-emitting control line, a first electrode of the first transistor is electrically connected to the initial voltage terminal, and a second electrode of the first transistor is electrically connected to the first electrode of the light-emitting element;

a control electrode of the second transistor is electrically connected to the first scanning line, a first electrode of the second transistor is electrically connected to the control terminal of the driving circuit, and a second electrode of the second transistor is electrically connected to the first electrode of the driving circuit;

a control electrode of the third transistor is electrically connected to the second light-emitting control line, a first electrode of the third transistor is electrically connected to the first terminal of the driving circuit, and a second electrode of the third transistor is electrically connected to the first electrode of the light-emitting element; and a gate electrode of the driving transistor is electrically connected to the control terminal of the driving circuit, a first electrode of the driving transistor is electrically connected to the first terminal of the driving circuit, and a second electrode of the driving transistor is electrically connected to the second terminal of the driving circuit.

18. The display device according to claim 17, wherein the first transistor and the second transistor are each an n-type transistor, and the driving transistor and the third transistor are each a p-type transistor.

19. The display device according to claim 16, wherein the energy storage circuit comprises a storage capacitor, a first terminal of the storage capacitor is electrically connected to the control terminal of the driving circuit, and a second terminal of the storage capacitor is electrically connected to the second voltage terminal.

20. The display device according to claim 16, wherein the data written-in circuit comprises a fourth transistor, and the second light-emitting control circuit comprises a fifth transistor;

a control electrode of the fourth transistor is electrically connected to the second scanning line, a first electrode of the fourth transistor is electrically connected to the data line, and a second electrode of the fourth transistor is electrically connected to the second terminal of the driving circuit; and a control electrode of the fifth transistor is electrically connected to the first light-emitting control line, a first electrode of the fifth transistor is electrically connected to the second voltage terminal, and a second electrode of the fifth transistor is electrically connected to the second terminal of the driving circuit.

* * * * *